Jan. 28, 1964  W. R. TAGGERT  3,119,127
BOAT TRAILER
Filed Sept. 28, 1961
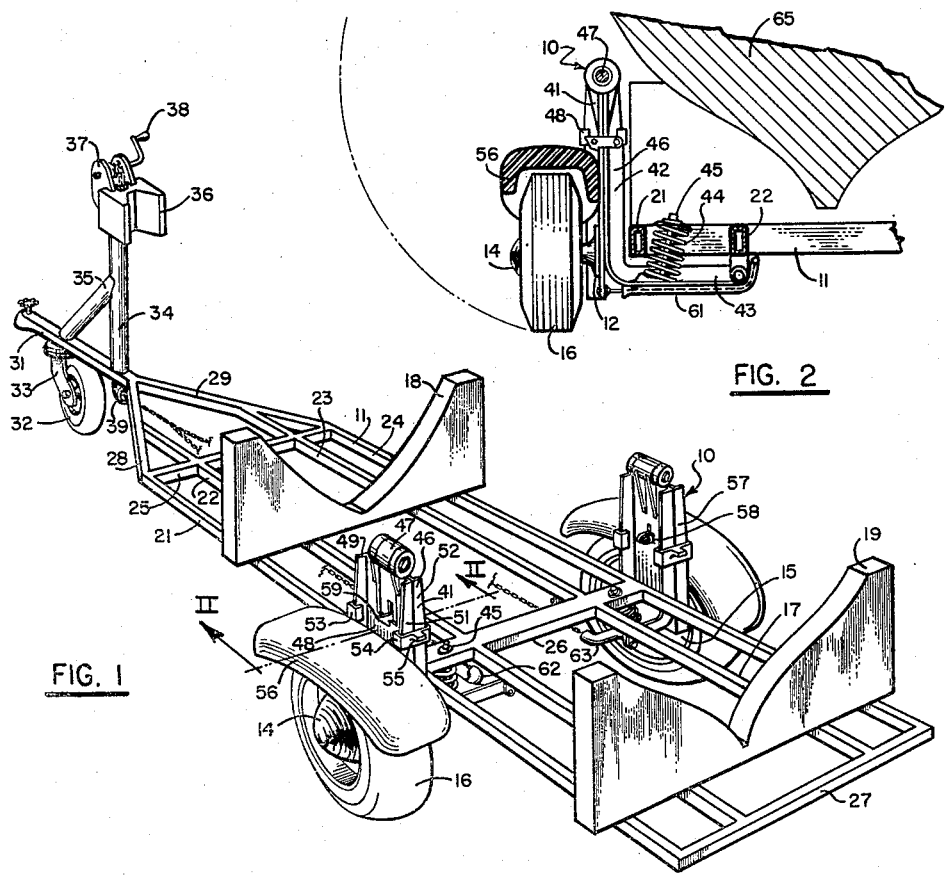
INVENTOR.
WILMER R. TAGGERT
BY
*Norman S. Blodgett*
ATTORNEY

United States Patent Office 3,119,127
Patented Jan. 28, 1964

3,119,127
BOAT TRAILER
Wilmer R. Taggert, 7 Orient St., Boylston, Mass., assignor of fifty percent to Norman S. Blodgett, Worcester, Mass.
Filed Sept. 28, 1961, Ser. No. 141,509
4 Claims. (Cl. 9—1)

This invention relates to a boat trailer and more particularly to apparatus arranged to transport small water craft from one place to another.

It is common practice in transporting boats to make use of a trailer attached to the rear of an automobile. Providing such a trailer for small boats is not much of a problem, because the boat can be placed on the trailer by moving the boat into shallow water and backing the automobile with the trailer attached down to the edge of the water so that the trailer sits in the water while the automobile is on the land. It is usual practice to provide such trailers with a small winch (at the end that attaches to the automobile) to pull the boat out of the water onto the trailer. Where large boats, particularly those with fixed keels, are concerned, however, it is not possible to bring the boat close enough to the shore to perform the operation which has just been described. In the case of such large boats and boats with keels, it has been necessary, in the past, to provide a large trailer and to place the boat on the trailer by moving the boat up to a dock which is provided with a derrick. The derrick lifts the boat up into the air, swings it over the trailer, lowers it onto the trailer. The use of such facilities is, of course, an expensive matter and this prohibits the owner of the boat from moving this boat from one place to another on the trailer very frequently. As a matter of fact, this operation is performed only when the owner is moving his boat from one permanent dock to another across considerable areas of land. None of the trailers used in the past make it possible to move boats with keels from the owner's home to various harbors as may suit his purpose. One of the advantages of being able to keep such a large boat at home, particularly if the owner lives some distance from the ocean or large bodies of water, is that he would be able to work on the hull and superstructure during the evening or during off seasons. These and other disadvantages of the prior art have been obviated in a novel manner by the present invention.

It is, therefore, an outstanding object of the invention to provide a boat trailer which may be effectively used with large boats and boats with fixed keels.

Another object of this invention is the provision of a boat trailer on which a boat may be loaded in deep water.

A further object of the present invention is the provision of a boat trailer which is capable of floating and which contains means for raising and lowering the floatation center of gravity in the water.

It is another object of the instant invention to provide a boat trailer adapted to be attached to the rear of an automobile or other motorized vehicle, wherein a boat may be placed on the trailer a considerable distance from the shore while separated from the automobile.

It is a further object of the invention to provide a boat trailer which is capable of being floated under a boat with a keel in deep water and which may then be readily raised to embrace the boat.

A still further object of this invention is the provision of a boat trailer that is simple in construction, inexpensive to manufacture, and is capable of a long life of useful service.

It is a still further object of the present invention to provide a trailer for large boats and boats with fixed keels in which the use of dock facilities and derrick apparatus is not necessary to load the boat on the trailer.

Another object of the invention is the provision of a boat trailer which has wheels with substantial pneumatic tires, wherein the trailer has sufficient buoyancy to float in the water, and in which means is provided for raising and lowering the wheels to shift the center of buoyancy and the level of floatation of the trailer in the water.

Another object of the invention is the provision of a boat trailer which has a degree of buoyancy and which may be introduced under a boat lying in relatively deep water by an operator standing in comparatively shallow water and whose buoyancy may be appreciably changed to raise the trailer under the boat by the operator from his position in the water.

Another object of the invention is the provision of a boat trailer in which a heavy boat may be mounted on the trailer without the use of expensive dock and derrick facilities and without the possible damage to the boat due to the use of a winch for pulling the boat on the trailer.

Another object of the invention is the provision of a boat trailer which is buoyant and whose center of buoyancy may be raised vetrically to control the level of floatation of the trailer in the water as desired.

With these and other objects in view, as will be apparent to those skill in the art, the invention resides in the combination of parts set forth in the specification and covered by the claims appended hereto.

FIG. 1 is a perspective view of a boat trailer embodying the principles of the present invention;

FIG. 2 is a vertical sectional view of the trailer taken on the line II—II of FIG. 1;

FIG. 3 is a rear elevational view of the device in one condition of operation; and FIG. 4 is a rear elevational view of the device during another condition of operation.

Referring first to FIG. 1, wherein are best shown the general features of the invention, the boat trailer, indicated generally by the reference numeral 10, is shown as consisting of a main frame 11 from which extends laterally two axles 12 and 13 on which are mounted wheels 14 and 15, respectively. Associated with these parts and forming buoyancy means for the trailer are pneumatic tires 16 and 17 mounted on the wheels 14 and 15, respectively. Cradle members 18 and 19 are mounted on the frame 11 and are formed of polystyrene foam or other light-weight water-proof material. Additional flotation means is provided by the fact that the main frame 11 is formed of light-weight, hollow, tubular structural members.

The frame 11 is made up of four parallel spaced longitudinal members 21, 22, 23, and 24 joined by three lateral members 25, 26, and 27. At the forward end of the main frame the longitudinal members 21 and 24 merge with yoke members 28 and 29 to form a point from which extends a longitudinal boom 31. The forward end of the boom is suitably formed to attach to a trailer coupling on the rear of an automobile in a manner which is well known in the art. Extending downwardly from the intermediate portion of the boom is a third wheel 32 mounted on a suitable retractable carriage 33 in such manner that it may be folded under the boom during normal trailer use, but so that it may be lowered, on occasion, to act as a resting point for the forward end of the trailer.

Extending vertically upwardly from the front of the trailer near the junction of the side members 28 and 29 with the boom 31 is a forward post 34 which is held rigidly in position by a reinforcing rod 35. At the top of the post is mounted a buffer block 36 having a V-shaped notch facing rearwardly; the block is formed of a somewhat resilient material to receive the front end of a boat without damage. Also mounted at the top of the post 34 is a winch 37 of the ratchet-and-pawl type having an actuating handle 38. The post 34 is hollow, extends through the boom 31, and is formed with a rearwardly-directed neck 39 well below the lower surface of the boom 31.

The axle 12 which carries the wheel 14 and the pneumatic tire 16 is connected to the frame 11 and extends laterally therefrom by means of a supporting structure 41. The structure 41 comprises an L-shaped member 42 having a horizontal leg 43 underlying the frame 11 and hingedly attached for movement about a longitudinal axis to the underside of the longitudinal frame member 22. A coil spring 44 extends between the intermediate portion of the horizontal leg 43 and the lateral member 26 of the frame. A suitable bolt 45 lies within the spring and joins the two members to limit downward movement about the pivotal axis. The L-shaped member is also provided with a vertical leg 46 which is provided at its upper portion with a hinge 47 providing for a hinged connection about a longitudinal horizontal axis with a wheel-mounting plate 48. The axis 12 is suitably fastened to the bottom part of the wheel-mounting plate 48; normally, the wheel-mounting plate 48 lies vertically and in contact with the outwardly-facing surface of the vertical leg 46 of the L-shaped member 42. The wheel-mounting plate 48 is provided with outwardly-directed flanges 49 and 51 while the vertical leg 46 of the L-shaped member is provided with similar inwardly-directed flanges 52. The flange 49 of the wheel-mounting plate 48 and a flange 52 of the vertical leg lie in the same lateral vertical plane and are locked together by a generally C-shaped clip 53. The outer edges of the flanges are inclined toward one another with the larger dimension downwardly so that the clip may be forced down over the flanges and draw them tightly together. A similar clip 54 joins the flange 51 and the other flange 52. Each of the clips is provided with an outwardly-directed lug, such as the lug 55 on the clip 54, whereby a hammer may be used to drive each clip down over the flanges to hold the wheel-mounting plate 48 and the L-shaped member 42 in closely locked condition. Mounted on the wheel-mounting plate 48 and overlying the tire 16 is an additional buoyancy means in the form of a fender 56. This fender is formed of polystyrene foam or other light-weight, waterproof material and, if necessary, may have substantial thickness to provide the bulk which may be necessary for buoyancy. The axle 13 (on which is mounted the wheel 15 and the tire 17) is held in a supporting structure 57 similar to the supporting structure 41 which supports the wheel 14. Extending from the inwardly-directed surface of each of the vertical legs of the L-shaped members associated with the supporting structures 41 and 57 is an ear 58 (which is best shown in FIG. 1 in connection with the supporting structure 57). This ear has pivotally attached to it a detent finger 59, which is best shown in connection with the supporting structure 41 in FIG. 1. The detent finger is provided with a spring (not shown) which holds it in a downwardly-biased direction at all times. Each detent finger is notched to fit over an upper edge of one of the wheel mounting plates to hold each wheel-mounting plate in juxtaposition to the vertical leg of its respective L-shaped member. This detent action is in addition to the holding accomplished by use of the clips 53 and 54. Fastened to the undersurface of the horizontal leg 43 of the L-shaped member 42 is a tube 61 which, at its inner end, is provided with a forwardly-directed neck 62 (see FIG. 1). A similar guide tube 63 underlies the supporting structure 57 associated with the wheel 15. Two cables are attached to the drum of the winch 37 and extend downwardly through the post 34 and emerge from the open end of the neck 39 under the main frame 11. One of these cables extends rearwardly and enters the neck 62 of the guide tube 61, proceeds through the guide tube, and is fastened to the lower end of the wheel-mounting plate 48. The other cable extends through the guide tube 63 and is attached to the wheel-mounting plate associated with the supporting structure 57. It should be noted that the wheel 15 and its tire 17 are provided with a fender 64 similar to the fender 56 associated with the wheel 14.

The operation of the invention will now be readily understood in view of the above description. Let us assume, for the purposes of explanation, that it is desired to place a boat 65 on the trailer where a dock is not available. The boat is brought as close to the shore as possible; the operator then places the boat trailer 10 in the general condition shown in FIG. 3 with the clips 53 and 54 removed on both the supporting structure 41 and the supporting structure 57, the detent fingers 59 being unlatched. As the trailer is pushed into the water (by the operator grasping the boom 31 and backing the trailer into the water from the shore), the wheels after losing contact with the bottom, will move upwardly toward the surface of the water under the impetus of the buoyancy provided by the pneumatic tires 16 and 17 and the buoyant fenders 56 and 64. As the trailer is moved into deeper and deeper water, the trailer will have a buoyancy which will be determined by four major factors, i.e., the buoyancy of the cradles 18 and 19, the buoyancy of the tubular structural members of which the main frame 11 is formed, the buoyancy in the fenders 56 and 64, and the buoyancy, of course, of the pneumatic tires 16 and 17. Naturally, the center of buoyancy will be determined by the relative positions of these buoyant members. When the wheels and fenders are permitted to move upwardly, as is true when the clamping and declamping mechanism is inoperative, the main frame 11 will reside a considerable distance below the surface of the water. In this floating condition, the trailer is backed toward the boat (whose centerline is directed at a right angle to the shore or to the slope of the bottom under the water at that point). The front of the boat enters the deep notches in the cradles 18 and 19 and, eventually, the bow is brought to bear on the notch of the buffer block 36. At that time, the supporting surfaces of the cradles 18 and 19 are either below the surface of the boat 65 or are in only light contact therewith. Once the trailer has thus been positioned under the boat, the operator, by rotating the actuating handle 38 of the winch 37, causes tension to be brought on the cables which extend downwardly through the post 34. These cables 65 and 66 are, of course, attached to the bottoms of the wheel supporting members; the tension in the cables acts through the guide pipes 61 and 63 and pulls the wheel-mounting plates downwardly. In other words, the cables rotate each plate downwardly about the hinge 47 and the corresponding hinge of the supporting structure 57. Since the detent fingers 59 are downwardly-biased when the wheel-supporting plates have been swung into contact with the vertical legs of the L-shaped members of the supporting structures 41 and 57, the detents will temporarily lock the tubes together. This, of course, is not sufficient for extensive travel along a road, but it is adequate for use until such time as the trailer with the boat is brought onto land. Now, once the cables 65 and 66 have been wound on the winch 37 and the wheels have been lowered to the position shown in FIG. 4, the center of buoyancy of the trailer, of course, will have been raised. The trailer then moves upwardly in the water and presses firmly against the bottom of the boat 65. As a matter of fact, this connection between the trailer and the boat is such that, if the boat has a small auxiliary engine, the boat and trailer may be propelled about in the water as a unit to a suitable place on the shore. In many situations, it will probably be necessary that the boat be brought to the trailer, rather than the trailer brought to the boat. Once the boat and trailer have been drawn out of the water, the operator should hammer the clips 53 and 54 in place to lock the wheel-mounting plates and the vertical legs of the L-shaped member solidly together for travel. As the trailer proceeds over the road, it will be noted that the coil spring 44 and the corresponding element associated with the supporting structure 57 provide for a soft, resilient support for the boat. In this connection, it should also be noted that the present structure does not have a single axle extending completely across the frame. This means that large wheels and tires may be used without the axle extending at a very high point in the trailer across the trailer; in old designs, using a single solid axle extending across the trailer, the size of the boat was definitely limited. For instance, a deep keel could not be used without the boat extending a considerable distance up into the air and obstructing the view from the automobile as well as presenting a very high center of gravity which was capable of tipping over and the like. It can be seen that, by the use of the present apparatus, it is not necessary to attach a strong winch to the front of the boat to pull it out of the trailer. Actually, little force is necessary to position the trailer under the boat, because the trailer is simply floated under the boat and a change in buoyancy is introduced to bring it up under and into contact with the boat. Furthermore, the trailer may be used no matter how large the boat or how deep the keel, since the trailer may be brought to the boat even in deep water, and it is not necessary to keep the trailer within hitching distance of the automobile. It should be noted that the advantage of being able to use very large diameter tires with deep-keeled boats without interference from a transverse axle going through the trailer also provides another advantage in that such a large tire provides considerable extra buoyancy that would be necessary with the large type trailer that would be used with such a large boat.

It is obvious that minor changes may be made in the form and construction of the invention without departing from the material spirit. It is not, however, desired to confine the invention to the exact form herein shown and described, but it is desired to include all such as properly come within the scope claimed.

The invention having been thus described, what is claimed as new and desired to secure by Letters Patent is:

1. A boat trailer, comprising a main frame, a supporting structure fastened to each side of the frame, an axle extending laterally from each of the supporting structures, a wheel mounted on each axle, floatation means rendering the trailer buoyant in water, means for adjusting the position of the said floatation means from a first position above the main frame to a second position on a general level with the main frame, the supporting structure consisting of an L-shaped member having one horizontal leg underlying the main frame and a vertical leg extending alongside the main frame, the inner end of the horizontal leg being hingedly attached to the main frame for swinging about a longitudinal axis and consisting also of a wheel mounting plate to which the axle is attached, the wheel mounting plate being hingedly attached to the upper end of the vertical leg of the L-shaped member for pivotal movement about a longitudinal axis.

2. A boat trailer as set forth in claim 1, wherein the said floatation means consists of pneumatic tires mounted on the said wheels and covers associated with the tires formed of a high buoyancy material.

3. A boat trailer as recited in claim 1, wherein the main frame is provided with bulky cradle members formed of high buoyancy material.

4. A boat trailer, comprising an elongated main frame, a supporting structure hingedly fastened to each side of the frame adjacent one end for movement about a horizontal axis, an axle extending laterally from each of the supporting structures, a wheel mounted on each axle, pneumatic tires mounted on the wheel rendering the trailer buoyant in water, a supplemental floatation means fixed to the main frame, the supporting structure being capable of swinging movement about the said axis for permitting the position of the said tires to be changed from a first position above the main frame to a second lower position, cables extending from points on the supporting structures spaced from and extending perpendicular to the said axes, the cables extending to the other end of the main frame, and a winch means connected to the cables to produce the swinging movement of the supporting structure.

References Cited in the file of this patent
UNITED STATES PATENTS

| | | |
|---|---|---|
| 2,215,703 | Jackson | Sept. 24, 1940 |
| 2,361,951 | Livermon | Nov. 7, 1944 |
| 2,421,671 | West | June 3, 1947 |
| 2,622,893 | Wasserlein | Dec. 23, 1952 |
| 3,004,771 | Moore | Oct. 17, 1961 |
| 3,067,439 | Brush | Dec. 11, 1962 |